June 22, 1926.

C. W. SCIFORD

HAY LOADER

Filed Jan. 14, 1924

June 22, 1926.
C. W. SCIFORD
HAY LOADER
Filed Jan. 14, 1924
1,590,125
4 Sheets-Sheet 2
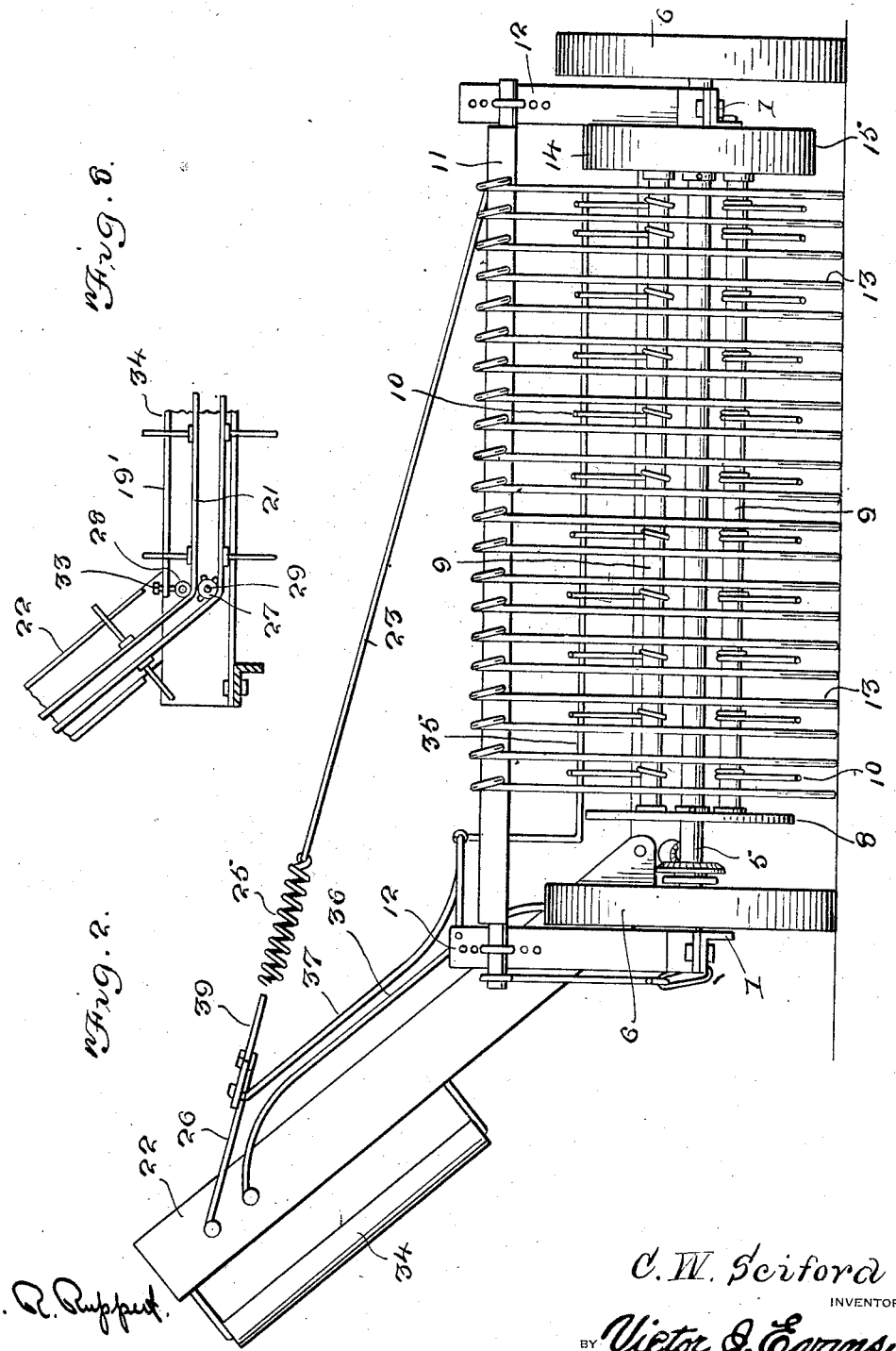

June 22, 1926.
C. W. SCIFORD
HAY LOADER
Filed Jan. 14, 1924
1,590,125
4 Sheets-Sheet 3
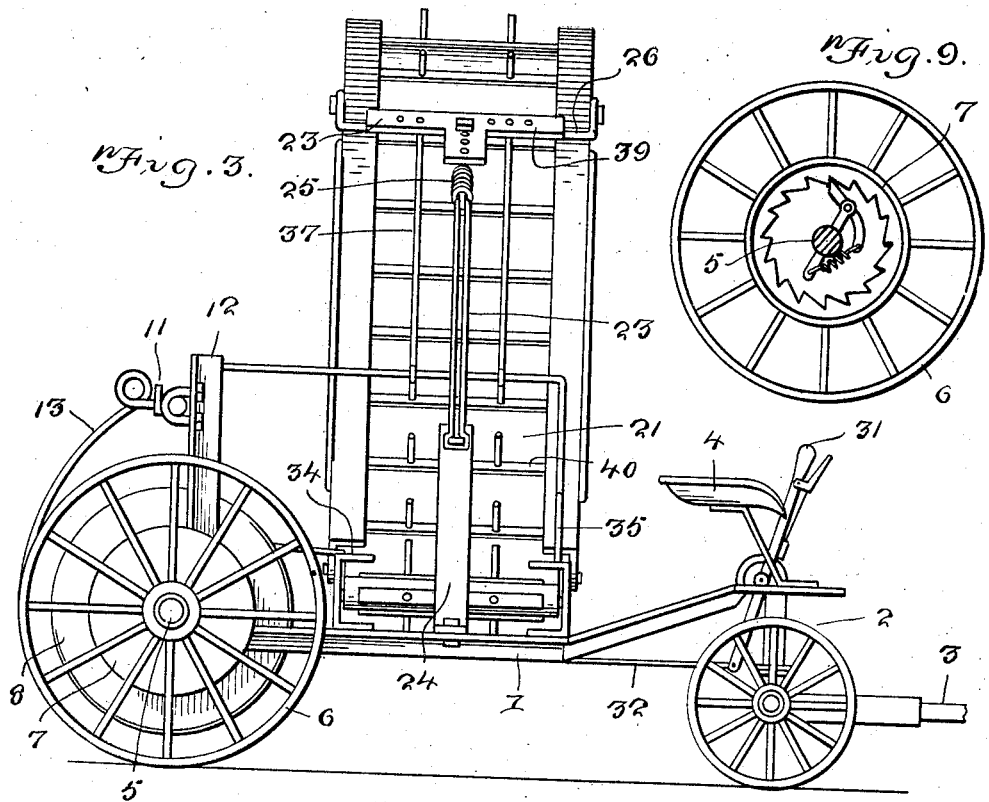
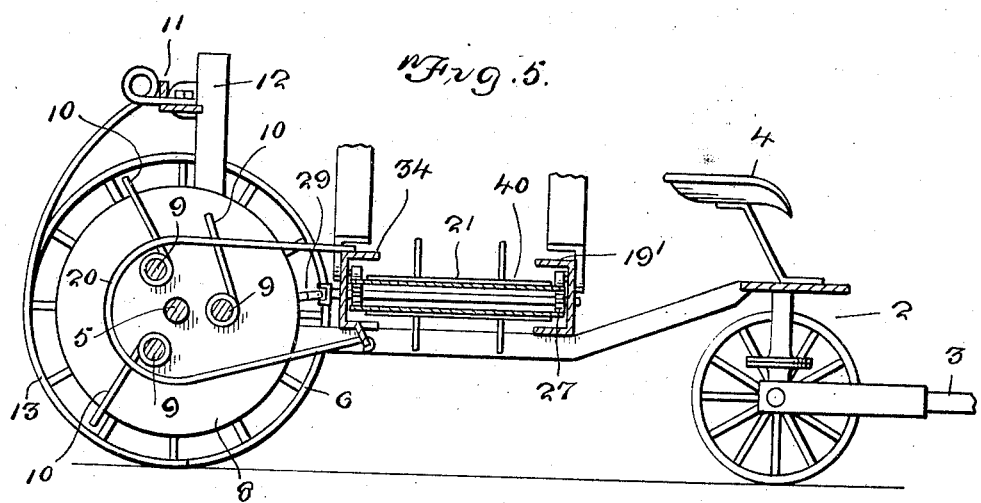

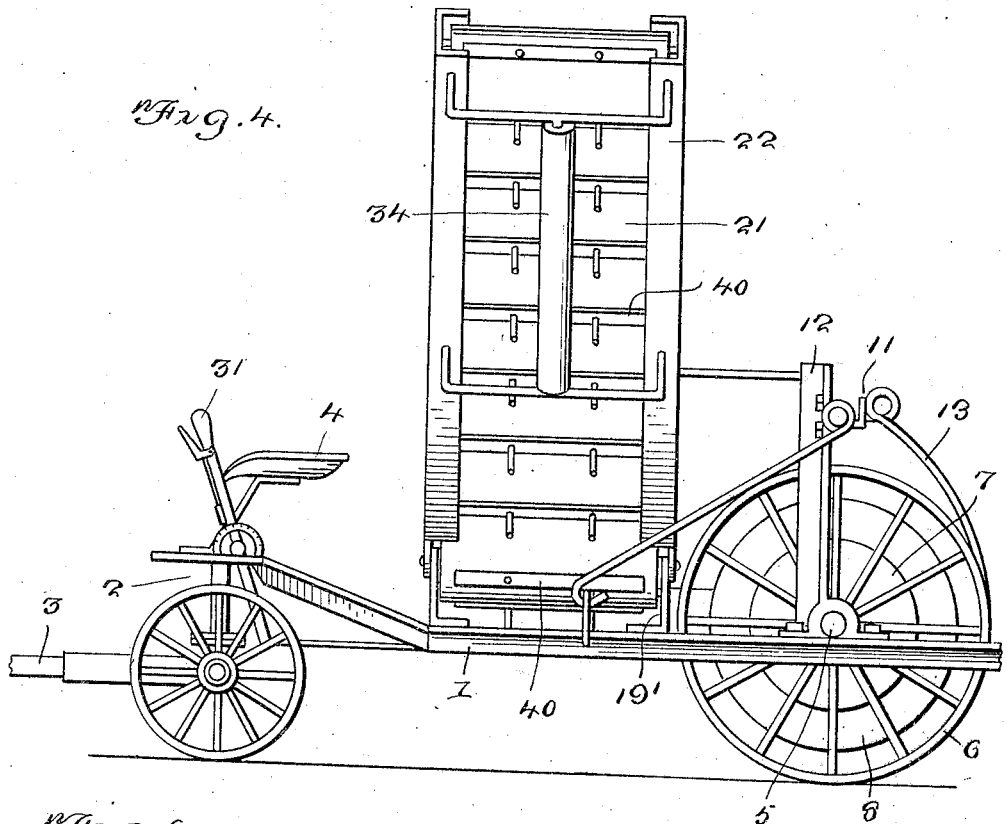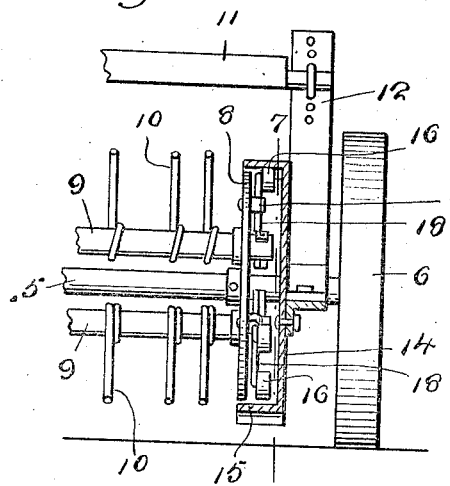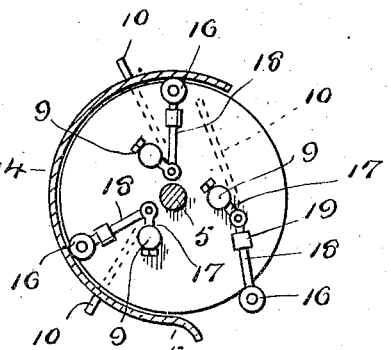

Patented June 22, 1926.

1,590,125

UNITED STATES PATENT OFFICE.

CHESTER W. SCIFORD, OF EAGLE BUTTE, SOUTH DAKOTA.

HAY LOADER.

Application filed January 14, 1924. Serial No. 686,173.

This invention relates to a side delivery hay loader, the general object of the invention being to provide means for picking up the hay from the field and delivering it to a platform from which it is conveyed to a hay rack at one side of the apparatus.

Another object of the invention is to provide a toothed cylinder for taking the hay from the pick-up teeth and depositing it upon the platform with guards looped around the cylinder for preventing the hay becoming entangled in the teeth thereof.

Another object of the invention is to provide means to cause the cylinder teeth to pick up the hay with the minimum amount of pressure against the rake teeth and to cause the cylinder teeth to drop backwards after they pass a perpendicular position so that they will not hang to the hay which will drop on the platform and then to cause the cylinder teeth to straighten out to be ready to pick up a new quantity of hay at the next revolution.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of the invention.

Figure 2 is a rear view.

Figure 3 is a side view looking from the right.

Figure 4 is a side view looking from the left.

Figure 5 is a section on line 5—5 of Figure 1.

Figure 6 is a fragmentary end view, with parts in section, showing the means for operating the teeth 10.

Figure 7 is a section on line 7—7 of Figure 6.

Figure 8 is a fragmentary view showing the connection of the elevator with the cross conveyor.

Figure 9 is a view of one of the wheels and the ratchet mechanism for connecting the same with the shaft.

In these views 1 indicates a frame which is supported at its front by the truck 2 to which is attached the tongue 3. The operator's seat is shown at 4. A shaft 5 is carried by the frame and the wheels 6 are connected with the shaft by the ratchet mechanism 7 so that the shaft is caused to rotate on the forward movement of the wheels, this arrangement of parts being similar to that used on mowing machines. A pair of disks 8 are carried by the shaft and these disks are connected together by the bars 9 which carry the pick-up teeth 10. The disks and bars form a toothed cylinder which revolves with the shaft. A bar 11 is supported by the uprights 12 of the frame and this bar is adjustably connected with the uprights so that it can be adjusted in a vertical plane. Curved rake teeth 13 have their upper ends connected with the bar and these teeth surround the rear part of the cylinder with the teeth 10 arranged between the teeth 13 so as to take the hay therefrom. By adjusting the bar 11 in the uprights 12 the rake teeth can be adjusted relative to the ground. A drum 14 is associated with each disk and each drum is provided with a cam-shaped flange 15 which is engaged by the rollers 16 on the rods 18 which are pivotally connected with the arms 17 at the ends of the bars 9. The rods 18 are slidably supported by the eye members 19, pivotally mounted in the disks 8 so that the bars 9 are given movement as the cylinder revolves so that the teeth 10 will carry the hay from the rake teeth and deposit it upon the platform 19' with the minimum amount of effort. The flanges 15 are so arranged as to engage the rollers 16 with the maximum amount of pressure just as the teeth 10 of the cylinder leave the ground to engage the hay on the rake teeth, thus causing the hay to be picked up with the minimum amount of pressure against the rake teeth. When the cylinder teeth are about perpendicular, the pressure on the rollers is relieved somewhat and when the cylinder teeth reach a point slightly beyond the perpendicular the pressure is entirely removed so that the teeth will drop back and not hang in the hay and thus permit the hay to drop upon the platform without interference on the part of the cylinder teeth. When the cylinder teeth have passed the platform pressure is again brought to bear on the rollers so as to straighten out the teeth and place them in a position to engage a new quantity of hay on the rake teeth on the next revolution of the cylinder.

Guards 20 are looped around the cylinder to prevent the hay from winding thereon, these guards having their ends fastened to the inner part of the platform. They are placed at intervals of about a foot apart between the cylinder teeth.

The hay platform 19' is fastened to the frame just ahead of the wheels and cylinder and is so constructed that the hay will drop thereon from the cylinder teeth. An endless conveyor 21 is carried by this platform and this conveyor extends up over the elevator frame 22 which is hingedly connected with one end of the platform and is adjustably supported from the other end of the platform by means of the flexible member 23 which has one end connected with the bracket 24 and its other end to a spring 25 which is connected to the looped brace 26, connected with the top of the elevator frame. The conveyor passes over the rollers 27 at the ends of the platform and elevator frame and between the small rolls 28 on said parts at the sides thereof. One of the rollers 27 is connected by the gears and shafts 29 with one of the ground wheels so that the conveyor will be actuated as the apparatus is moved along. Clutch means 30 are provided for disconnecting the conveyor from the ground wheel. The clutch means are actuated from the hand lever 31 which is arranged adjacent the driver's seat by the connections 32. The small rolls 28 are adjustable as shown at 33 so that they can be pressed against the conveyor belt with the desired amount of pressure. These rolls are protected from contact with the hay by the flanges 34 at the edges of the platform. The gearing is so designed as to drive the conveyor at the same rate of speed as that given to the apparatus. The elevator frame is detachable and it is provided with a roller 34 at its rear which acts as a bumper against the hay rack. A hay guard 35 is fastened to the right end of the platform and extends along the front thereof to the other end where it is fastened to one of the uprights at the other end of the frame. This guard is formed from an iron rod with that portion adjacent the elevator curving upwardly to prevent it from interfering with the hay passing into the elevator. Guards 36 are arranged at the sides of the elevator and other guards 37 are arranged at the top of the elevator for directing the hay on to the rack, these guards being fastened to a plate 39 which is supported by the brace 26. The conveyor is formed of belting which carry slats 40, the ends of which terminate short of the edges of the belting so as to permit the rolls to engage said edges.

This apparatus is adapted to be pulled along the field and the wagons or racks adapted to be driven under the elevator and moved across the field with the apparatus so that the hay is loaded as the two vehicles move along. After the wagon is full it is moved from under the elevator and another wagon takes its place. Thus there is no hooking and unhooking of the apparatus from the wagon as is the case with hay loaders as now used.

From the foregoing it will be seen that the hay is raked up by the teeth 13 and this hay is taken up by the cylinder teeth and carried around and dumped on the platform. The looped guards prevent the hay from becoming entangled in the cylinder teeth and the cams and arms and levers enable the cylinder to carry the hay around with the minimum amount of effort. The conveyor carries the hay from the platform to the elevator and up the elevator from which it drops into the wagon. This apparatus will load hay very quickly and will clean the field perfectly. It will handle the heaviest kind of hay and will not scatter the leaves.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In a hay rake, a toothed cylinder, comprising a shaft, a pair of disks thereon, bars having their ends passing through the disks, teeth carried by the bars, an arm on an end of each bar, a rod pivoted to each arm and slidably mounted on a disk, a roller on the outer end of each rod, and a cam flange on the disk for engaging the rollers for causing the teeth to engage and lift the hay on their upward movements, the flange terminating a little beyond the top of the disk so that the roller will leave the flange as the teeth start to descend so that the teeth will move rearwardly and disengage the hay.

In testimony whereof I affix my signature.

CHESTER W. SCIFORD.